United States Patent
Hu et al.

(10) Patent No.: US 8,957,770 B2
(45) Date of Patent: Feb. 17, 2015

(54) AUTOMATIC NETWORKING APPARATUS AND SYSTEM FOR VEHICLES

(75) Inventors: Junfeng Hu, Waterdown (CA); Weihua Shi, Shanghai (CN); Wei Li, Shanghai (CN)

(73) Assignee: Shanghai Baolong Automotive Corporation, Shanghai (CN)

( * ) Notice: Subject to any disclaimer, the term of this patent is extended or adjusted under 35 U.S.C. 154(b) by 474 days.

(21) Appl. No.: 13/324,689

(22) Filed: Dec. 13, 2011

(65) Prior Publication Data

US 2012/0146779 A1    Jun. 14, 2012

Related U.S. Application Data

(63) Continuation-in-part of application No. 12/946,545, filed on Nov. 15, 2010, now Pat. No. 8,416,068.

(51) Int. Cl.
 *G08B 21/00* (2006.01)
 *B60D 1/62* (2006.01)
 *H04L 29/08* (2006.01)

(52) U.S. Cl.
 CPC . *B60D 1/62* (2013.01); *H04L 67/12* (2013.01)
 USPC .......................... 340/431; 340/425.5; 340/438

(58) Field of Classification Search
 USPC ............................ 340/431, 426.22, 425.5, 438
 See application file for complete search history.

(56) References Cited

U.S. PATENT DOCUMENTS

| | | | |
|---|---|---|---|
| 5,397,924 A | 3/1995 | Gee et al. | |
| 5,442,810 A | 8/1995 | Jenquin | |
| 5,693,985 A | 12/1997 | Gee et al. | |
| 5,738,092 A * | 4/1998 | Mock et al. | 128/205.23 |
| 5,739,592 A | 4/1998 | Rigsby et al. | |
| 5,854,517 A | 12/1998 | Hines | |
| 5,877,455 A | 3/1999 | Kyrtsos | |

(Continued)

FOREIGN PATENT DOCUMENTS

CN    201654796 U    11/2010

OTHER PUBLICATIONS

International Search Report for International Application No. PCT/IB2012/000684, mailed Aug. 14, 2012.

(Continued)

*Primary Examiner* — George Bugg
*Assistant Examiner* — Naomi Small
(74) *Attorney, Agent, or Firm* — Fraser Clemens Martin & Miller LLC; Thomas J. Krul

(57) ABSTRACT

A vehicle automatic networking apparatus with a first component and a second replaceable component includes a first identity recognition module on the first component and a second identity recognition module on the second component. The second module in a networking mode transmits a low frequency wake up signal through a low frequency signal transmission circuit to wake up the first module. A first identity recognition module low frequency sensor circuit senses the low frequency wake up signal, and responds by transmitting an identity code of the first component through a low frequency signal transmission circuit. A second module low frequency signal receiving circuit receives and stores the first component identity code. In a following data transmission, the second module sends data with the identity code, and a first component receiving apparatus identifies it. The first and second modules are both located rearward of a second component connection hitch.

20 Claims, 9 Drawing Sheets

(56) References Cited

U.S. PATENT DOCUMENTS

| | | | |
|---|---|---|---|
| 6,007,346 A | 12/1999 | Gutierrez et al. | |
| 6,259,357 B1 * | 7/2001 | Heider | 340/431 |
| 6,323,566 B1 * | 11/2001 | Meier | 307/10.2 |
| 6,480,104 B1 * | 11/2002 | Wall et al. | 340/431 |
| 6,811,419 B2 | 11/2004 | Bure | |
| 7,142,098 B2 | 11/2006 | Lang et al. | |
| 7,307,514 B2 | 12/2007 | McAden | |
| 7,336,159 B2 | 2/2008 | Fackrell et al. | |
| 7,348,878 B2 * | 3/2008 | Fogelstrom | 340/442 |
| 7,619,506 B2 | 11/2009 | Knoll et al. | |
| 7,760,077 B2 | 7/2010 | Day | |
| 7,880,595 B2 | 2/2011 | Shimura | |
| 7,911,330 B1 | 3/2011 | Perten et al. | |
| 7,932,815 B2 * | 4/2011 | Martinez et al. | 340/431 |
| 2002/0030590 A1 * | 3/2002 | Dieckmann et al. | 340/431 |
| 2005/0062590 A1 * | 3/2005 | Lang et al. | 340/431 |
| 2007/0225872 A1 * | 9/2007 | Luebke et al. | 701/1 |
| 2007/0241868 A1 * | 10/2007 | Fackrell et al. | 340/431 |
| 2008/0042817 A1 * | 2/2008 | Fogelstrom | 340/442 |
| 2008/0303648 A1 * | 12/2008 | Day | 340/431 |

OTHER PUBLICATIONS

Written Opinion of the International Searching Authority for International Application No. PCT/IB2012/000684, mailed Aug. 14, 2012.

* cited by examiner

AUTOMATIC NETWORKING APPARATUS AND SYSTEM FOR VEHICLES

CROSS-REFERENCE TO RELATED APPLICATIONS

This application is a continuation-in-part of U.S. patent application Ser. No. 12/946,545 filed on Nov. 15, 2010. The entire disclosure of the above application is incorporated herein by reference.

FIELD OF THE INVENTION

The present invention relates to an automatic networking apparatus for vehicles, through which information (e.g. pressure, temperature etc.) the user needs to collect can be automatically sent to a display terminal.

BACKGROUND

As traffic develops more prosperously, management requirement for vehicles as carriers of transportation are getting stricter. Up till now, however, there is yet no good method to address frequent exchange of vehicles. In particular, for those vehicles with trailers, a tractor may take a different trailer from time to time, and there is even a situation where the tractor takes a plurality of trailers simultaneously, which will make monitoring of the vehicles extraordinarily difficult. Generally, a display terminal is always in a driver's cab so to make it easier for the driver to watch; however, the vehicle information needs to be displayed usually varies, thus how to accurately display the information of the hitched trailer on the display terminal is a problem difficult to solve in monitoring the vehicles.

In the present scenario, a common approach is that a data collection device disposed on the trailer collects information about the trailer, and a data collection device disposed on the tractor collects information about the tractor, and these two devices are connected via wires and data transmission is carried out through these wires and to the display of the tractor for displaying. When the trailer is replaced, the connection harness is also changed.

Though the problem caused by replacement of the trailers can be solved in this manner, an obvious limitation of this manner is that a large amount of harness should be disposed on the vehicles and the installation is quite inconvenient. Plug-socket connection for the harness is required when replacing the trailers. This approach is not only high in installation cost, but also low in maintenance efficiency.

On the other hand, wireless networking monitoring for the vehicles has also been proposed. But the proposed wireless approach only solved the problem of harness installation of the wired solution, while at the same time, brought along a problem regarding how to verify the identity of the trailer accurately. Generally, when the wireless approach is adopted, an identity code matching operation requiring more specialized skills has to be carried out after replacing the trailer(s) in order to realize networking for the vehicles.

SUMMARY OF THE INVENTION

The present disclosure provides a simplified and more flexible automatic networking apparatus for vehicles.

In order to solve the aforementioned problem, there is provided an automatic networking apparatus for vehicles which can be used with vehicles having a first component and a second replaceable component, wherein the automatic networking apparatus comprises a first identity recognition module disposed on the first component and a second identity recognition module disposed on the second component, wherein the first identity recognition module comprises a low-frequency sensor circuit, a high-frequency signal transmission circuit and a controller. The low-frequency sensor circuit will respond to a low-frequency wake-up signal. The controller connects the low-frequency sensor circuit and the high-frequency signal transmission circuit, and in response to the low-frequency wake-up signal control the high-frequency signal transmission circuit to transmit an identity code corresponding to the first component. The second identity recognition module comprises a low-frequency signal transmission circuit, a high-frequency signal receiving circuit and a controller. The low-frequency signal transmission circuit can transmit the low-frequency wake-up signal, and the high-frequency signal receiving circuit can receive the aforementioned identity code which has been transmitted by the aforementioned high-frequency signal transmission circuit. The controller connects the low-frequency signal transmission circuit and the high-frequency signal receiving circuit, and the controller is used for activating the low-frequency signal transmission circuit and storing the identity code received by the high-frequency signal receiving circuit.

In the aforementioned automatic networking apparatus, the first component is a tractor of a vehicle and the second component is a trailer of a vehicle.

In the aforementioned automatic networking apparatus, the second identity recognition module further comprises a high-frequency signal transmission circuit by which the second identity recognition module receives data collected from the second component and forwards the data loaded with the identity code.

In the aforementioned automatic networking apparatus, when the second component of the vehicle is connected to the first component, power is supplied by the first component to it, and a power supply line of the second identity recognition module is connected to the power supply circuit of the second component, and when powered on, the controller of the second identity recognition module determines the second component being connected to the first component and activates the low-frequency signal transmission circuit.

In the aforementioned automatic networking apparatus, the first identity recognition module further comprises a battery power supply circuit.

In the aforementioned automatic networking apparatus, the first identity recognition module is disposed within an area covered by the low-frequency signal of the second identity recognition module.

With the aforementioned technical schemes, the present invention has the following notable advantages over the prior arts:

1. Automatic code matching is realized by adopting a low-frequency wake-up process, such that the monitoring procedure is completely automated and no manual operation is needed, and the user does not need to make any operation in use requiring specialized skills, therefore errors otherwise could occur during the manual code matching are avoided, resulting in simplified and convenient usage, while such automation of the whole procedure also lead to low maintenance cost during use and efficient utilization of the vehicle.

2. Since a wireless mode is adopted in signal transmission between the first identity recognition module and the second identity recognition module, installation workload is reduced enormously, and a large amount of harness is no longer necessary, resulting in low hardware cost and labor cost for installation thereof.

BRIEF DESCRIPTION OF THE DRAWINGS

In order to make the aforementioned objects, characteristics and advantages of the present invention more apparent and easier to understand, a detailed description of the embodiments of the present invention will be given in conjunction with the accompanying drawings in which.

DETAILED DESCRIPTION

Figure 1:
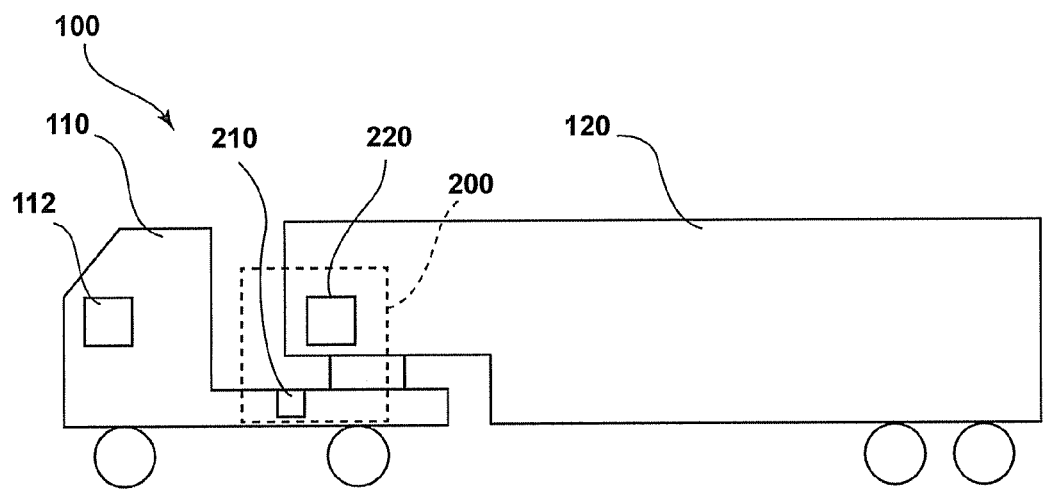
FIG. 1 is a structural diagram of one embodiment of the automatic networking apparatus for vehicles.

FIG. 1 is a structural diagram of one embodiment of the automatic networking apparatus for vehicles. Referring to FIG. 1, an automatic networking apparatus 200 is disposed in an environment of a vehicle 100 which comprises a tractor 110 and a trailer 120. In other embodiments, the automatic networking apparatus can also be used in a vehicle where a first component and a second replaceable component need to be networked. The automatic networking apparatus 200 comprises a first identity recognition module 210 and a second identity recognition module 220. The first identity recognition module 210 is disposed on the tractor 110, and the second identity recognition module 220 is disposed on the trailer 120. In addition, a receiving and displaying apparatus 112 is disposed on the tractor 110.

Figure 2:
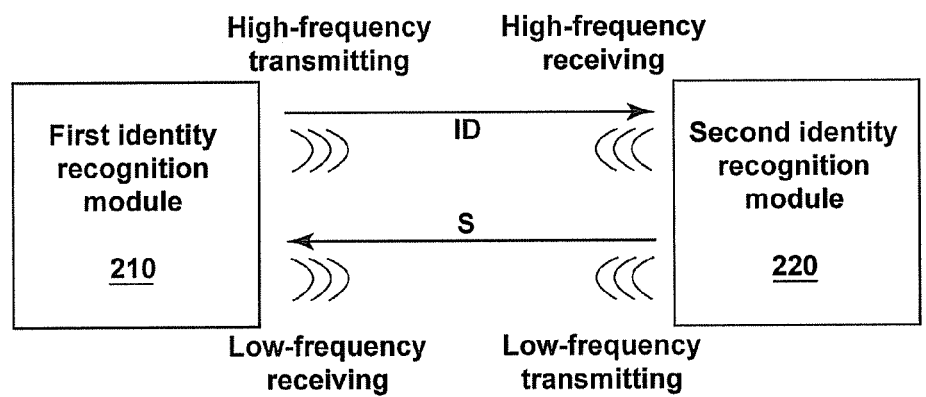
FIG. 2 is a data communication flow chart of one embodiment of the automatic networking apparatus for vehicles.

FIG. 2 is a data communication flow chart of one embodiment of the automatic networking apparatus for vehicles. In brief, the first identity recognition module 210 functions to wirelessly transmit an identity code corresponding to the vehicle tractor 110. The wireless transmission signal can be a high frequency signal. The second identity recognition module 220 functions to forward data associated with the trailer 120 which need to be collected. These data can be acquired from measurement by the temperature and pressure sensors disposed on each of the wheels of the trailer 120, and transmitted to the second identity recognition module 220 in a wired or wireless mode. According to the conception of the present disclosure, the first identity recognition module 210 does not continuously transmitting the aforementioned identity code, instead, it waits for a trigger condition. The second identity recognition module 220 can trigger the first identity recognition module 210 through signals. Here, the low-frequency signal which has a short wireless transmission range (possibly shorter than the width of the vehicle body) can be used as a wake-up signal S because of its high reliability.

The aforementioned triggering is done by the second identity recognition module 220 as the trailer 120 is connected to the tractor 110 so as to begin networking. Though the triggering can be completed manually, in one embodiment of the present invention, the second identity recognition module 200 determines, through certain information, the trailer 120 has been connected to the tractor 110. For instance, generally, the tractor 110 supplies power to electronic components of the trailer 120. Each of the electronic devices, such as the power supply line of the second identity recognition module 220, is connected to the power supply circuit of the trailer 120 to get power supply. When the second identity recognition module 220 is powered on, it considers the trailer 120 has been connected to the tractor 110 and turns into a networking mode and transmits the low-frequency wake-up signal S to wake up the first identity recognition module 210.

After the first identity recognition module 210 turns into the networking signal transmission mode, it transmits an identity code ID corresponding to the tractor with a high-frequency scheme, and the ID is received by the second identity recognition module 220 and stored therein. Thus, the second identity recognition module 220 recognizes the tractor which is currently connected.

According to an embodiment of the invention, there is no need to pre-store, for each other, the respective identity recognition information before networking between the first identity recognition module and the second identity recognition module, instead, the networking is accomplished by mutually learning the identity recognition information after networking of both modules.

Figure 3:
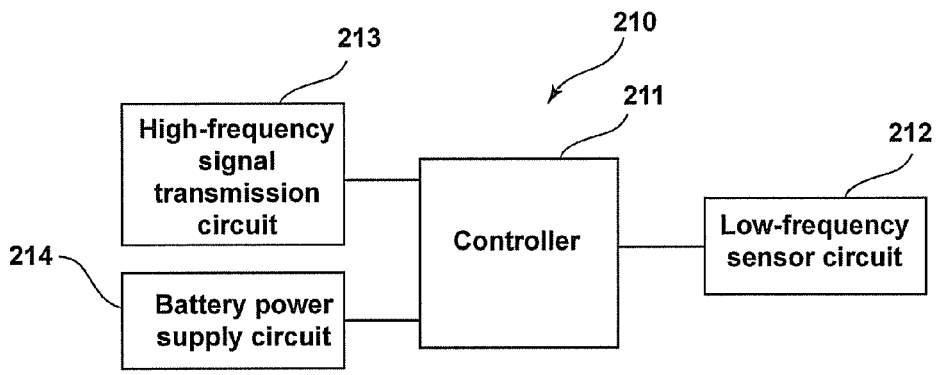
FIG. 3 is a structural diagram of one embodiment of a first identity recognition module.

FIG. 3 is a structural diagram of one embodiment of the first identity recognition module. Referring to FIG. 3, the first identity recognition module 210 comprises a controller 211, a low-frequency sensor circuit 212, a high-frequency signal transmission circuit 213 and a battery power supply circuit 214. The controller 211 connects the low-frequency sensor circuit 212, the high-frequency signal transmission circuit 213 and the battery power supply circuit 214. The low-frequency sensor circuit 212 detects the low-frequency wake-up signal S. In response to the low-frequency wake-up signal, the controller 211 makes the module turn into networking signal transmission mode and transmit the identity code corresponding to the tractor through the high-frequency signal transmission circuit 213. A battery power supply can be adopted to avoid troublesome line connecting, due to the extremely low power consumption of the first identity recognition module 210.

Figure 5:
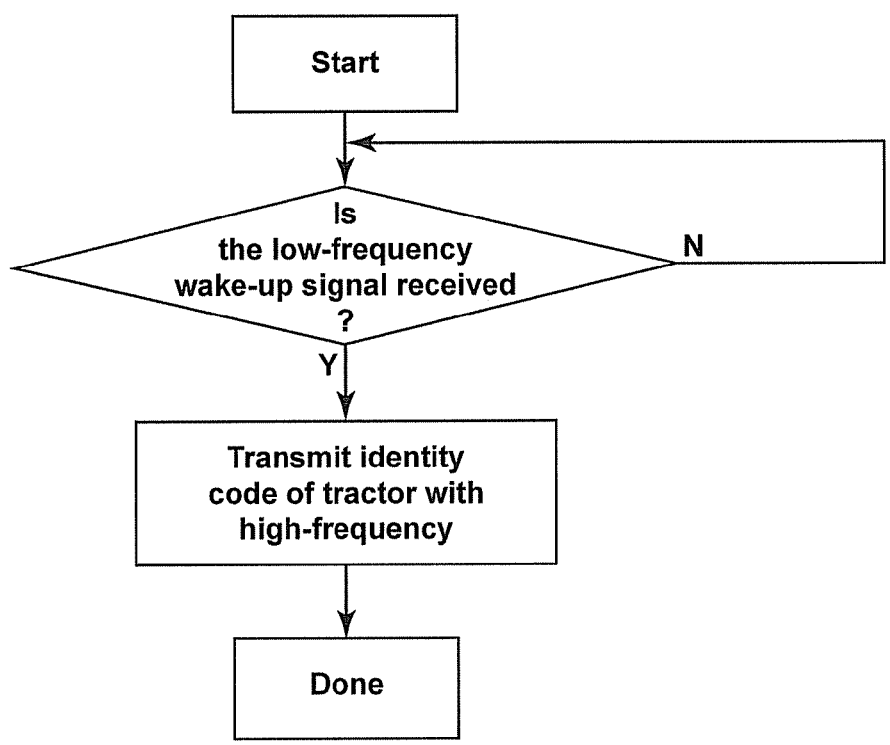
FIG. 5 is an exemplary implementation flow chart of a first identity recognition module.

FIG. 5 is an exemplary implementation flow chart of a first identity recognition module.

Figure 4:
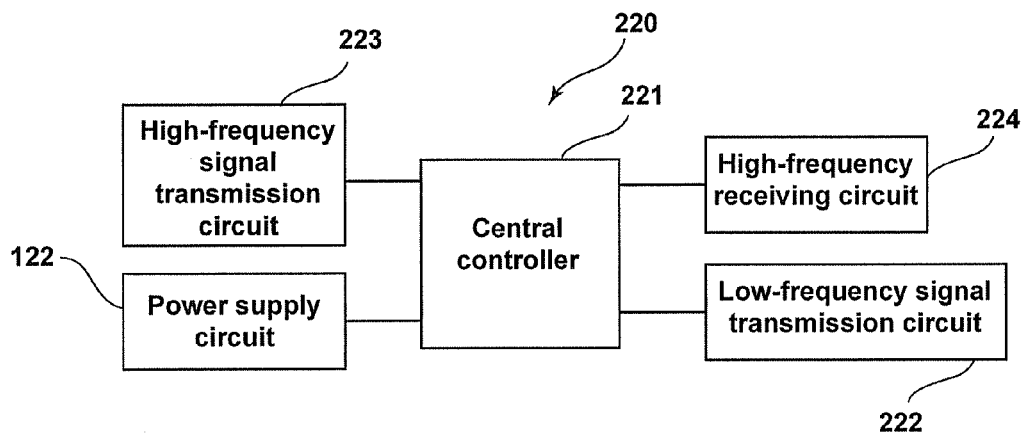
FIG. 4 is a structural diagram of one embodiment of a second identity recognition module.

FIG. 4 is a structural diagram of one embodiment of the second identity recognition module. Referring to FIG. 4, the second identity recognition module 220 comprises a controller 221, a low-frequency signal transmission circuit 222, a high-frequency signal transmission circuit 223 and a high-frequency signal receiving circuit 224. The controller 221 connects the low-frequency signal transmission circuit 222, the high-frequency signal transmission circuit 223 and the high-frequency signal receiving circuit 224. The controller 221 is connected to a power supply circuit 122 of the trailer. When the controller is powered on, it considers the trailer has been connected to the tractor and turns into the networking mode and instructs the low-frequency signal transmission circuit 222 to transmit the low-frequency wake-up signal to wake up the first identity recognition module 210. Once the first identity recognition module 210 transmitted the identity code, the high-frequency signal receiving circuit 224 receives the identity code ID and sends it to the controller 221 for storage, and then the controller 221 leaves the networking mode.

Figure 6:
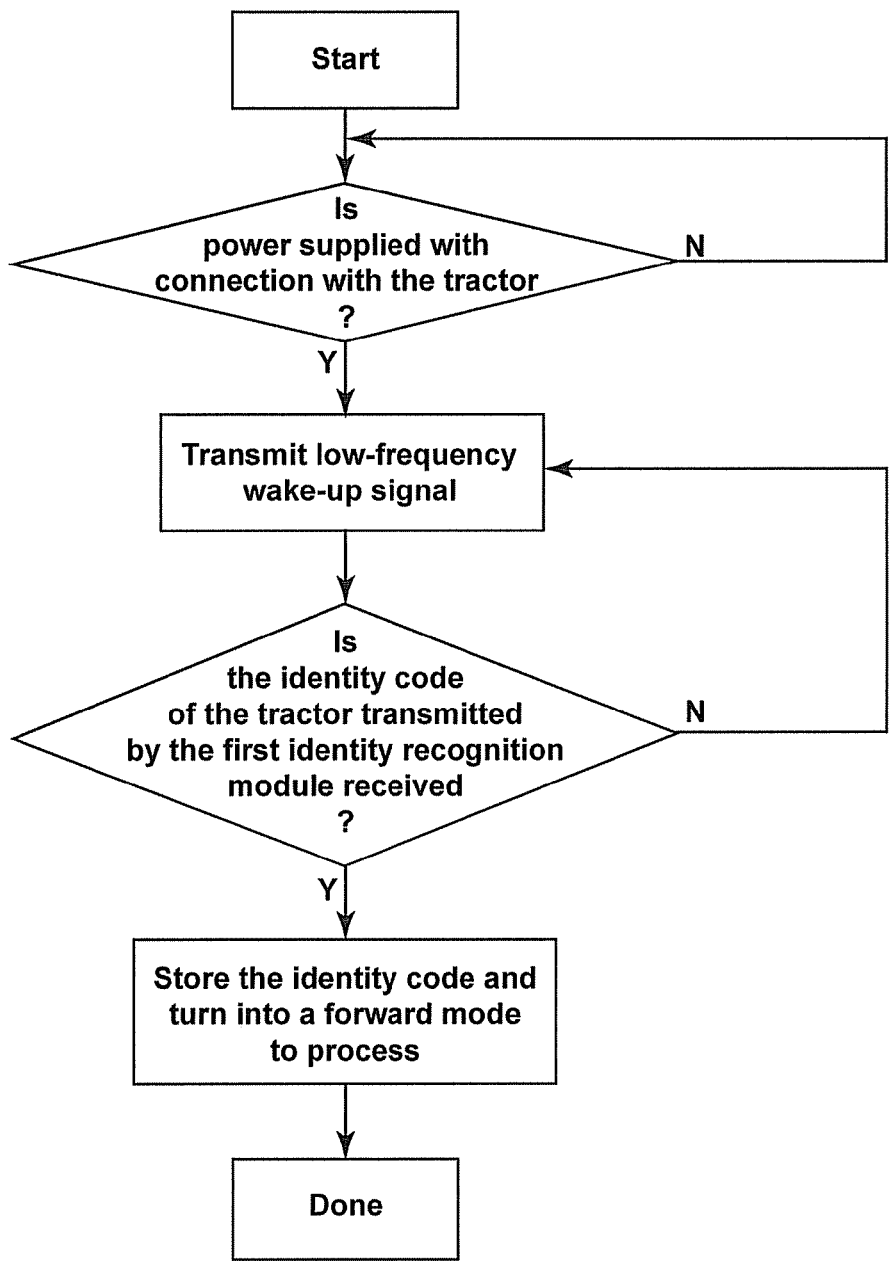
FIG. 6 is an exemplary implementation flow chart of a second identity recognition module.

FIG. 6 is an exemplary implementation flow chart of a second identity recognition module.

In one embodiment, the second identity recognition module 220 also receives data collected from the trailer through the high-frequency signal receiving circuit 224. However, it can be understood that there are various alternative methods to realize this object, for example, the second identity recognition module 220 may acquire the collected data through traditional wired schemes or other types of wireless signals. When the second identity recognition module 220 forwards the trailer data, the controller 221 will load the stored identity code of the tractor onto these data, and then forward the data through the high-frequency signal transmission circuit 223.

Figure 7:
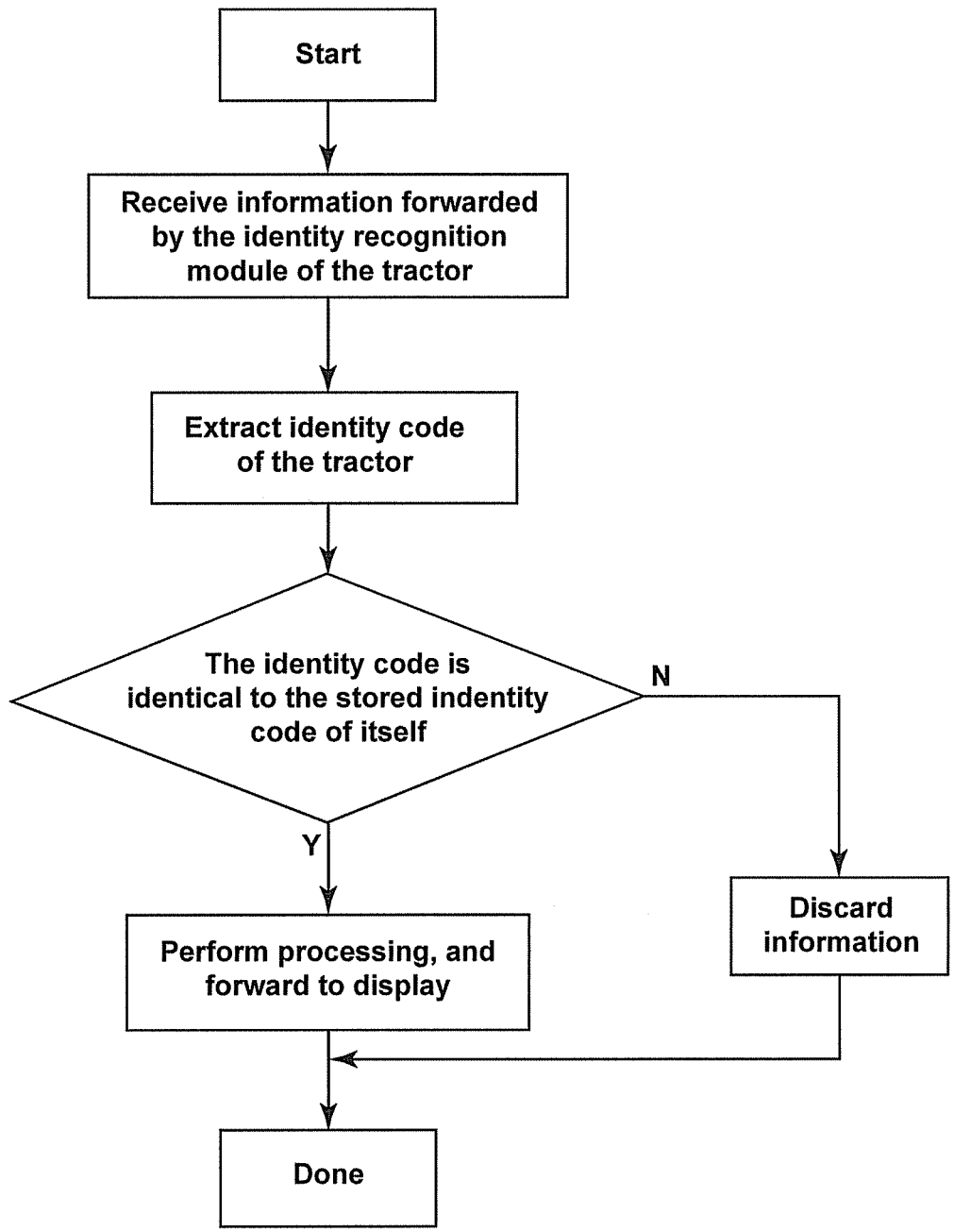
FIG. 7 is an exemplary flow chart between a receiving module and a displaying module.

When a receiving and displaying device 112 installed on the tractor 110 receives the data forwarded by the second identity recognition module 220, it will extract the identity code of the tractor and compare the identity code of the tractor received with the pre-stored identity code; if it is confirmed that the data belong to the present vehicle, the display processing will begin, otherwise the data will be discarded. FIG. 7 is an exemplary flow chart between a receiving module and a displaying module.

Installation positions of the aforementioned first identity recognition module 210 and the second identity recognition module 220 should take the coverage range of the wireless signal into consideration. For example, the first identity recognition module 210 should be positioned in the coverage range of the low-frequency signal of the second identity recognition module 220. The second identity recognition module 220 should be installed such that the high-frequency signal covers the receiving and displaying apparatus 112, while it should be covered by the high-frequency signal of the first identity recognition module 210 itself. Generally, the first identity recognition module 210 is installed at the tail end of the tractor which is close to the trailer, it needs to be fixed only and no harness is needed. The second identity recognition module 220 is positioned at the front end of the trailer, and in its installation one only needs to connect its power supply line to the general live wire of the trailer part and no other harness is necessary, thus the installation is quite easy.

After the first identity recognition module 210 turns into the networking signal transmission mode, it transmits an identity code ID corresponding to the tractor with a high-frequency scheme, and the ID is received by the second identity recognition module 220 and stored therein. Thus, the second identity recognition module 220 recognizes the tractor which is currently connected.

Figure 8:
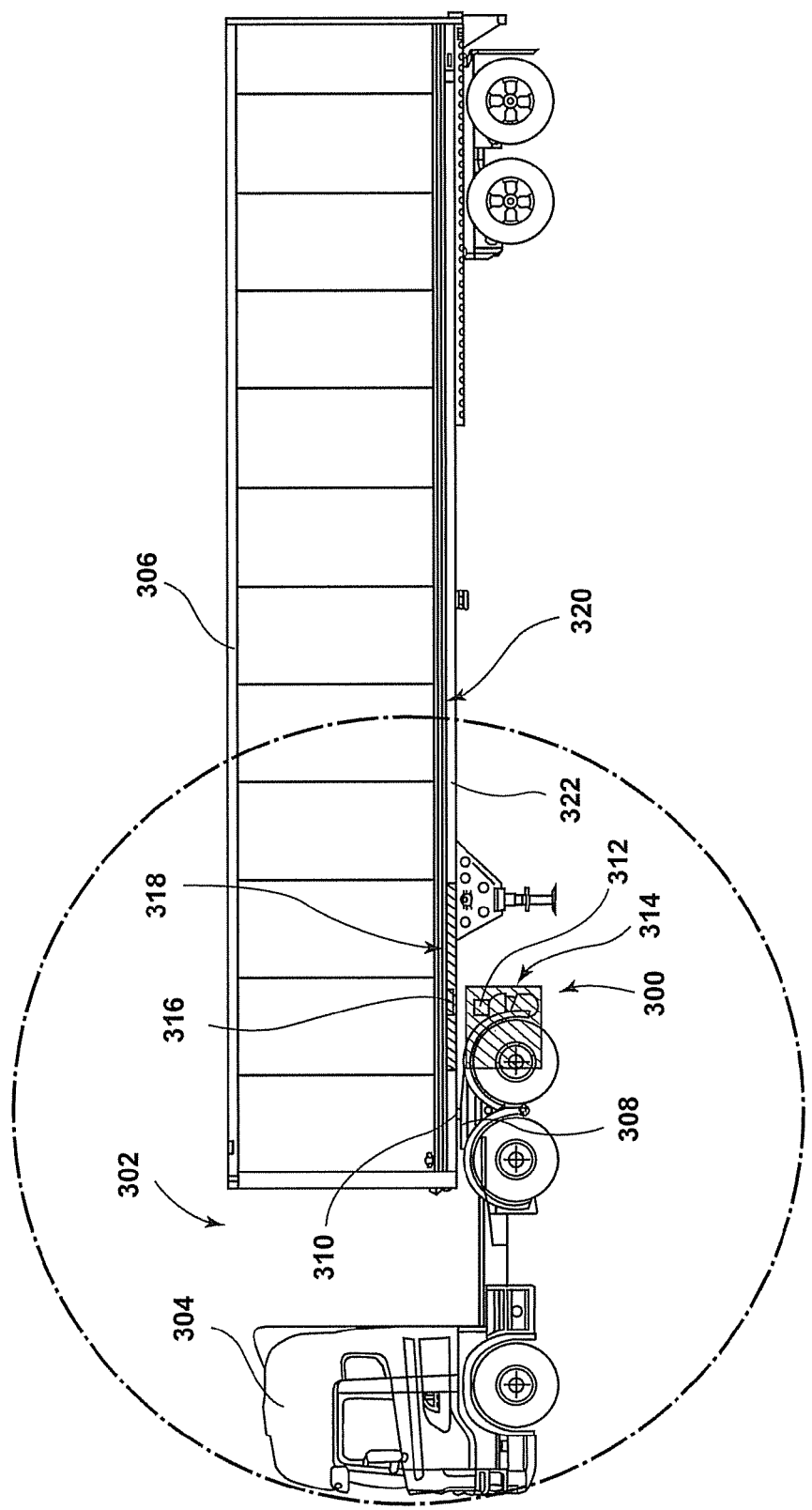
FIG. 8 is a front elevational view of a vehicle having another embodiment of the automatic networking apparatus for vehicles.

Referring to FIG. 8, according to additional aspects, an automatic networking system having an automatic networking apparatus 300 is disposed in an environment of a vehicle 302 which includes as a first component a tractor 304 and as a second component a trailer 306. A hitch plate 308 of known design connected to the tractor 304 receives a hitch pin 310 of the trailer 306 to releasably couple the trailer 306 to the tractor 304 for towing. Components of automatic networking apparatus 300 include a first identity recognition module 312 which is connected to tractor 304 at any location within a tractor rear zone 314, and a second identity recognition module 316 which is connected to trailer 306 at any location within a trailer zone 318. Second identity recognition module 316 is connected to structure of a bottom surface 320 of trailer 306, and/or to beam support structure 322 to which bottom surface 320 is connected. Automatic networking apparatus 300 is similar to automatic networking apparatus 200 except that in several embodiments low frequency signals and low frequency signal generating and receiving circuits and components are used throughout in place of high frequency components and circuits described in reference to FIGS. 1-7.

Figure 9:
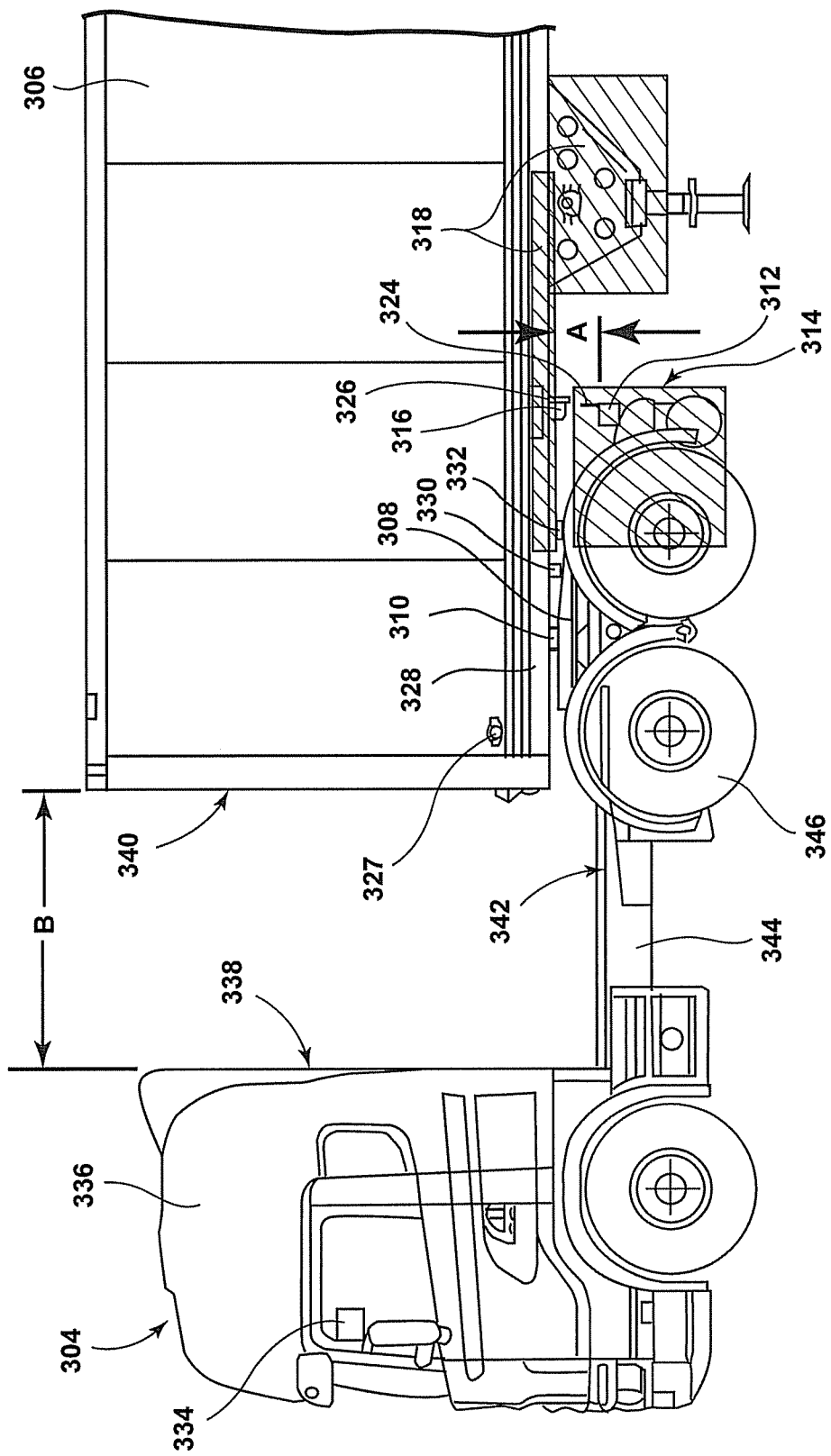
FIG. 9 is front elevational view of area 9 of FIG. 8.

Referring to FIG. 9, in the tractor rear zone 314 a high and/or low frequency antenna 324 which communicates with first identity recognition module 312 is positioned anywhere in tractor rear zone 314. Tractor rear zone 314 is defined as a 3-dimensional space located on the tractor 304, rearward of both the hitch plate 308 and the hitch pin 310, where the hitch pin 310 is connected to the hitch plate 308 including a bottom surface of trailer 306 and structure of a landing gear as shown. High and/or low frequency antenna 324 can also be provided with first identity recognition module 312.

With continued reference to FIG. 9, in the trailer zone 318 a low frequency antenna 326 which communicates with second identity recognition module 316 is positioned anywhere in trailer zone 318. Trailer zone 318 is defined as a 3-dimensional space located on the trailer 306, rearward of the hitch pin 310, and further rearward of a reinforced structural area 328 of trailer 306 which reinforces hitch pin 310. Clearance is therefore provided between second identity recognition module 316 and hitch plate 308 to allow free rotation of trailer 306 with respect to hitch pin 310. Low frequency antenna 326 can also be provided with second identity recognition module 316.

First identity recognition module 312 and high and/or low frequency antenna 324 can be connected to a data processing and/or display unit in tractor 304 or other part in tractor 304 by a hard-wire connection to provide power to first identity recognition module 312 and high and/or low frequency antenna 324. In addition, first identity recognition module 312 and high and/or low frequency antenna 324 can be connected to a data processing and/or display unit in tractor 304 or other part in tractor 304 by a hard-wire connection to transfer the low frequency signal of second identity recognition module 316 to tractor 304. This can be by direct hardwire or through a vehicle CANbus or other protocol. First identity recognition module 312 and high and/or low frequency antenna 324 can also be self-powered by a battery or an independent power source and transmit the high or low frequency signal wirelessly to the trailer 306.

Similarly, second identity recognition module 316 and low frequency antenna 326 can be connected to a data processing and/or display unit in the trailer 306 or other part in trailer 306 by a hard-wire connection to provide power to second identity recognition module 316 and low frequency antenna 326. In addition, second identity recognition module 316 and low frequency antenna 326 can be connected to a data processing and/or display unit in trailer 306 or other part in trailer 306 by a hard-wire connection to transfer the high and/or low frequency signal of first identity recognition module 312 and high and/or low frequency antenna 324 to trailer 306. This can be by direct hardwire or through the vehicle CANbus or other protocol. Second identity recognition module 316 and low frequency antenna 326 can also be self-powered by a battery 327 or similar independent power source. The low frequency signal is transmitted wirelessly to the tractor 304.

During operation, as trailer 306 is connected to the tractor 304, the trailer low frequency antenna 326 and second identity recognition module 316 can be mechanically triggered to send the low frequency wake-up signal and start the transmitting and receiving or operating session. This can be accomplished in multiple ways, including 1) physical contact of a mechanical device 330 such as a switch provided with trailer 306 to any portion of tractor 304; or 2) physical contact between mechanical device 330 and a device 332 such as a proximity sensor provided with tractor 304. Second identity recognition module 316 will transmit a series of low frequency signals. Because these signals are of a low frequency having a limited range for example of approximately 2 to 3 meters, the signals will not be received by a tractor or trailer parked or passing by tractor 304 or trailer 306.

When tractor 304 and trailer 306 are connected at hitch pin 310, only the tractor high and/or low frequency antenna 324 is positioned proximate to the trailer low frequency antenna 326, therefore no other tractor high or low frequency antenna installed on another tractor will be in the transmitting range of the trailer low frequency antenna 326. In a transmitting and receiving mode, when second identity recognition module 316 receives the signal sent from the tractor high and/or low frequency antenna 324 which includes the tractor identity or identity code, the signal will be saved in a memory of second identity recognition module 316. The second identity recognition module 316 will then exit the transmitting and receiving mode, and the connection between the tractor 304 and trailer 306 is established.

When the trailer second identity recognition module 316 subsequently sends alerts or data reports in a "data set" to the tractor 304, they can be viewed on either a monitor 334 of the tractor system which is positioned inside a tractor cab 336 and therefore visible to the operator of tractor 304, or transmitted to a fleet monitoring system through a data transmitting mechanism. The data transmitting mechanism can include a cellular data package transmitter, satellite transmitter or a Wi-Fi connection. These alerts or data reports can contain information such as a trailer tire pressure, a tire temperature, a trailer internal temperature, a trailer door open/closure condition, back or rear directed camera, or similar data. When the tractor 304 receives the low frequency signal from the trailer 306, if the low frequency signal includes the tractor identification number impended to the signal, the tractor 304 will accept the signal and display the data on monitor 334. As previously noted, if a low frequency signal not including the tractor identification number is received the signal will be discarded. The communication connection established between tractor 304 and trailer 306 is therefore both automatic and one-on-one such that no interference or cross talk will occur with a tractor-trailer positioned proximate to tractor 304 or trailer 306 even if equipped with the same automatic networking apparatus 300.

With continuing reference to FIG. 9, a distance "A" between first and second identity recognition modules 312, 316 of automatic networking apparatus 300 when positioned in rear tractor zone 314 and trailer zone 318 is less than a distance "B" between a rear face 338 of cab 336 and a forward wall or face 340 of trailer 340. The frequency for the low frequency signals between first and second identity recognition modules 312, 316 can therefore be selected to further minimize the possibility of cross talk between any other tractor or trailer than for systems having first and second identity recognition modules 312, 316 at the distance "B". Similarly, a distance between first and second identity recognition modules 312, 316 is also minimized using the configuration shown in FIG. 9 over a system having first identity recognition module 312 connected to a surface 342 of the frame structure 344 forward of driven wheels 346 of tractor 304 and having second identity recognition module 316 connected to forward face 340 of trailer 306.

Figure 10:
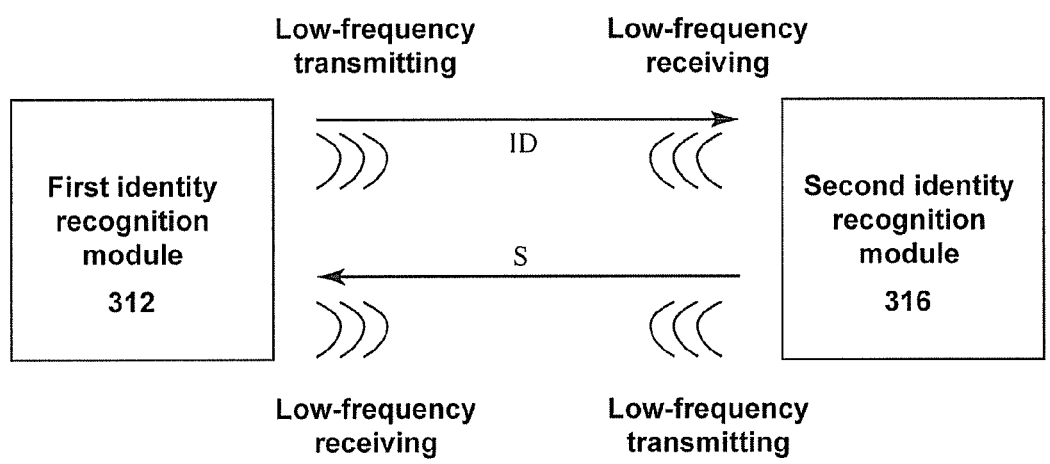
FIG. 10 is a data communication flow chart of another embodiment of the automatic networking apparatus for vehicles.

Referring to FIG. 10, a data communication flow chart of a further aspect of the automatic networking apparatus for vehicles is shown, and is modified from that shown in FIG. 2. In this embodiment, first identity recognition module 312 functions to wirelessly transmit an identity code corresponding to the vehicle tractor 304. The wireless transmission signal can be a high or a low frequency signal, and is shown in this example as a low frequency signal. The second identity recognition module 316 functions to forward any data associated with the trailer 306 which needs to be collected. These data can be acquired from measurement for example by temperature and pressure sensors disposed on or in each of the wheels of the trailer 306, a temperature of the trailer inner volume controlled by either an air conditioning unit or a heating unit, a trailer door open/closed condition signal, or other data, and transmitted to the second identity recognition module 316 in a wired or wireless mode. Similar to previously described embodiments, the first identity recognition module 312 does not continuously transmit the tractor identity code, instead, it waits for a trigger condition. The second identity recognition module 316 can initiate the trigger condition to the first identity recognition module 312 through wireless signals. Here, the low-frequency signal which has a short wireless transmission range (for example having a range of approximately 2 to 3 meters) can be used as the wake-up signal "S" because of its high reliability.

Figure 11:
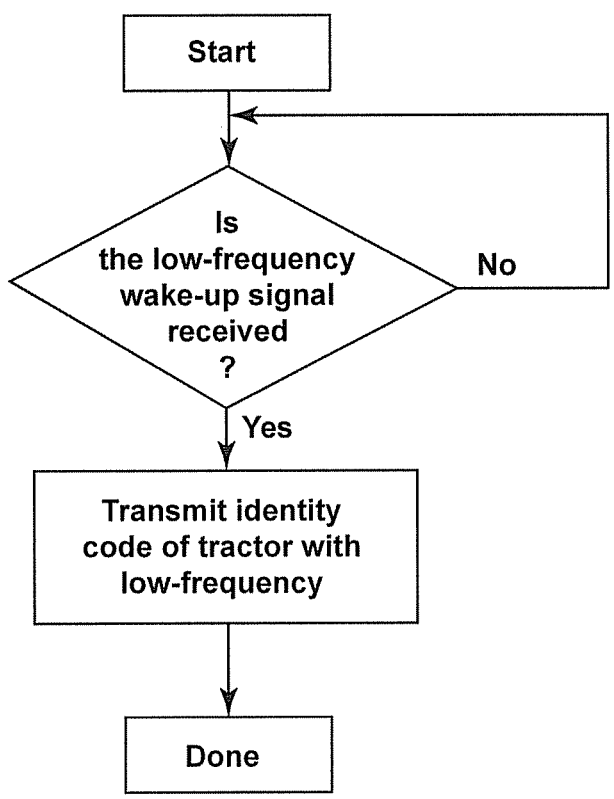
FIG. 11 is an exemplary implementation flow chart of a low frequency first identity recognition module.

Referring to FIG. 11 and again to FIG's 9 and 10, an exemplary implementation flow chart of the first identity recognition module 312 is provided for the low frequency operating option. When the low frequency wake-up signal from second identity recognition module 316 is received, first identity recognition module 312 transmits a low frequency signal in response which includes the identity code of tractor 304. When the identify code of the tractor 304 is received and stored by the second identify recognition module 316, the operating session for subsequent data transmission from trailer 306 to tractor 304 is then initiated.

The first identity recognition module 312 receives the low frequency wake-up signal "S" from the second identity recognition module 316 and sends a return signal "ID" including an identity code of the first component (tractor 304) to the second identity recognition module 316 thereby initiating an operating session. A data set subsequently sent to the tractor data processing and/or display unit through or not through the first identity recognition module 312 during the operating session has data from the second component (trailer 306) and also includes the identity code. The tractor data processing and/or display unit during the operating session discards any other data set not including the identity code.

The position of the trailer low frequency antenna 326 and the position of the tractor high and/or low frequency antenna 324 makes several things possible:

a) The trailer low frequency antenna 326 and the tractor high and/or low frequency antenna 324 are in close range with each other and therefore can be reached by low frequency signals. This ensures that there is no interference between signals of tractor 304 and trailer 306 with any other tractor or trailer in the vicinity that is equipped with the same or similar wireless system; and b) The configuration of automatic networking apparatus 300 eliminates the need for a cable (either a power or signal cable) to pass through the plate in the reinforced structural area 328 in the forward portion of the trailer bottom surface 320.

The terms "high frequency" and "low frequency" as used herein are used to distinguish generally between signal frequencies which have a wide or broad range of transmission and signal frequencies which have a short or narrow range of transmission. These frequencies can be selected by the manufacturer for specific applications and are therefore not limited to any frequency range, transmission range or distance identified herein. For example only, the high frequency signals can be within a range of 300 MHz to 3 GHz, and the low frequency signals can be within a range of 30 KHz to 300 KHz.

Compared with known systems, the embodiments of the present invention have the following notable advantages:

1. Automatic code matching is realized by adopting a low-frequency wake-up process, such that the monitoring procedure is completely automated and no manual operation is needed, and the user does not need to make any operation in use requiring specialized skills, therefore errors otherwise could occur during the manual code matching are avoided, resulting in simplified and convenient usage, while such automation of the whole procedure also lead to low maintenance cost during use and efficient utilization of the vehicle.
2. Since a wireless mode is adopted in signal transmission between the first identity recognition module and the second identity recognition module, installation workload is reduced enormously, and a large amount of harness is no longer necessary, resulting in low hardware cost and labor cost for installation.

While the present invention has already been described with the preferable embodiments as above, they are not meant to limit the present invention, and any skilled in the art can process some modification and improvement without departing form the spirit and bound of the present invention, thus the protection metes and bounds of the present invention should be defined by the claims.

What is claimed is:

1. An automatic networking system for a vehicle including a first component and a second replaceable component, comprising:
    a first identity recognition module disposed in a rear zone of the first component;
    a second identity recognition module disposed in a component zone of the second component;
    in an initial operation the second identity recognition module operating to send a low frequency wake-up signal to the first identity recognition module when the hitch is connected to the hitch plate;
    the first identity recognition module receiving the low frequency wake-up signal from the second identity recognition module and sending a return signal to the second identity recognition module thereby initiating an operating session, the return signal including an identity code of the first component; and
    a data set sent to the first identity recognition module during the operating session includes data from the second component and also includes the identity code, the first identity recognition module during the operating session operating to discard any other data set received by the first identity recognition module not including the identity code.

2. The automatic networking system of claim 1, wherein:
    the first identity recognition module includes a low-frequency sensor circuit to sense the low-frequency wake-up signal; and
    the second identity recognition module includes a memory to store the identity code and exits a transmitting and receiving mode upon storing the identity code.

3. The automatic networking system of claim 2, wherein the first identity recognition module includes a low-frequency signal transmission circuit operating to create the return signal as a low frequency signal.

4. The automatic networking system of claim 3, wherein the first identity recognition module includes a controller connecting the low-frequency sensor circuit and the low-frequency signal transmission circuit and responding to the low-frequency wake-up signal detected by the low-frequency sensor circuit and controlling the low-frequency signal transmission circuit to transmit the identity code corresponding to the first component.

5. The automatic networking system of claim 3, wherein the second identity recognition module includes a low-frequency signal transmission circuit transmitting the low-frequency wake-up signal; a low-frequency signal receiving circuit for receiving the identity code of the first component sent from the low-frequency signal transmission circuit; and a controller connecting the low-frequency signal transmission circuit and the low-frequency signal receiving circuit to activate the low-frequency signal transmission circuit and store the identity code of the first component received by the low-frequency signal receiving circuit.

6. The automatic networking system of claim 1, wherein the first component is a tractor of a vehicle, and the second component is a trailer of the vehicle.

7. The automatic networking system of claim 1, further including a device provided with the second component which when physically contacted by any portion of the first component initiates operation to send the low frequency wake-up signal.

8. The automatic networking system of claim 1, further including:
    a first device provided with the first component; and
    a second device provided with the second component which when physically contacted by or placed in proximity to the first device initiates operation to send the low frequency wake-up signal.

9. The automatic networking system of claim 1, wherein the first identity recognition module receiving the low frequency wake-up signal from the second identity recognition module operates to send the return signal only after receipt of the wake-up signal.

10. The automatic networking system of claim 1, wherein:
    the rearward zone is rearward of a hitch plate of the first component; and
    the second component zone is rearward of a second component hitch and rearward of the hitch plate of the first component when the hitch is connected to the hitch plate.

11. An automatic networking system for a vehicle including a first component and a second replaceable component, comprising:
    a first identity recognition module disposed on the first component in a rear zone of the first component rearward of a hitch plate of the first component;
    a second identity recognition module disposed on the second component in a second component zone rearward of a second component hitch and rearward of the hitch plate of the first component when the hitch is connected to the hitch plate;
    in an initial operation the second identity recognition module operating to send a low frequency wake-up signal to the first identity recognition module when the hitch is connected to the hitch plate; and
    the first identity recognition module operating only after receiving the low frequency wake-up signal from the second identity recognition module to send a return signal to the second identity recognition module thereby initiating an operating session, the return signal including an identity code of the first component.

12. The automatic networking system of claim 11, wherein a data set subsequently sent to the first identity recognition module during the operating session includes data from the second component and also includes the identity code, the first identity recognition module during the operating session operating to discard any other data set received by the first identity recognition module not including the identify code.

13. The automatic networking system of claim 11, further including:
  a low frequency antenna communicating with the first identity recognition module and positioned in the rear zone; and
  the rear zone defined as a 3-dimensional space located on a tractor defining the first component, rearward of both a hitch plate of the tractor and a hitch pin of a trailer defining the second component, when the hitch pin is connected to the hitch plate.

14. The automatic networking system of claim 11, further including a low frequency antenna communicating with the second identity recognition module and positioned in the second component zone.

15. The automatic networking system of claim 11, wherein electrical power to operate the first identity recognition module is provided via a cable connected to the first component, the first component being a vehicle tractor.

16. The automatic networking system of claim 11, wherein a data set from the second component includes a pressure signal from a tire of the second component.

17. The automatic networking system of claim 11, wherein a data set from the second component includes a temperature signal from a tire of the second component.

18. The automatic networking system of claim 11, wherein the second component is a trailer, and a data set from the trailer includes a temperature signal from the trailer.

19. The automatic networking system of claim 11, wherein:
  the low frequency wake-up signal is in a frequency range of 30 KHz to 300 KHz; and
  the return signal is in a frequency range of 300 MHz to 3 GHz.

20. The automatic networking system of claim 11, wherein both the low frequency wake-up signal and the return signal are in a frequency range of 30 KHz to 300 KHz.

* * * * *